(12) United States Patent
Miyashita

(10) Patent No.: US 8,863,943 B2
(45) Date of Patent: Oct. 21, 2014

(54) PLASTIC CHAIN CONVEYOR WITH MAGNET CONNECTING PINS

(75) Inventor: Michitaka Miyashita, Kanagawa (JP)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/983,110

(22) PCT Filed: Jan. 24, 2012

(86) PCT No.: PCT/US2012/022309
§ 371 (c)(1),
(2), (4) Date: Oct. 7, 2013

(87) PCT Pub. No.: WO2012/112260
PCT Pub. Date: Aug. 23, 2012

(65) Prior Publication Data
US 2014/0021022 A1    Jan. 23, 2014

(30) Foreign Application Priority Data
Feb. 14, 2011    (JP) .................................. 2011-028199

(51) Int. Cl.
*B65G 17/06*    (2006.01)
*B65G 17/08*    (2006.01)
*B65G 15/32*    (2006.01)

(52) U.S. Cl.
CPC .................................. *B65G 15/32* (2013.01); *B65G 17/08* (2013.01)
USPC .......................................... 198/850; 198/853

(58) Field of Classification Search
CPC ............... B65G 2207/30; B65G 17/06; B65G 21/2009; B65G 15/32; B65G 17/34; B65G 23/18
USPC .......................................... 198/850, 853, 831
See application file for complete search history.

(56) References Cited

U.S. PATENT DOCUMENTS

| 4,213,527 A | 7/1980 | Lapeyre et al. |
| 4,580,676 A | 4/1986 | Michelbrink et al. |
| 4,805,764 A | 2/1989 | Van Zijderveld, Jr. |
| 5,904,241 A | 5/1999 | Verdigets et al. |

(Continued)

FOREIGN PATENT DOCUMENTS

JP    07309417 A    11/1995

OTHER PUBLICATIONS

International Search Report and Written Opinion of the International Searching Authority, PCT/US2012/022309, mailed May 3, 2012, USPTO, Alexandria, Virginia.

*Primary Examiner* — James R Bidwell
(74) *Attorney, Agent, or Firm* — James T. Cronvich

(57) ABSTRACT

Front and back ends (2*a*, 2*b*) of plastic chain modules (2) made of a plastic material are rotatably linked by multiple plastic connecting pins (3*a*) and metal connecting pins (3*b*) to form an endless plastic chain conveyor (1). In the plastic chain modules (2) of the plastic chain conveyor (1), carrier surfaces (4*a*) (top surfaces) of module bodies (4) are smooth. Offset engaging parts (5*a*, 5*b*) that can be attached to and detached from each other in the width direction of the plastic chain conveyor (1) are formed on linking end pieces (4X) of the module bodies (4). Circular through-holes (6) receiving the bar-shaped connecting pins (3*a*, 3*b*) that rotatably link the offset engaging parts (5*a*, 5*b*) of the chain modules (2) are formed at the centers of the sides of the offset engaging parts (5*a*, 5*b*).

12 Claims, 5 Drawing Sheets

(56) References Cited

U.S. PATENT DOCUMENTS

| | | |
|---|---|---|
| 5,925,958 A | 7/1999 | Pire |
| 5,931,309 A | 8/1999 | Andersson |
| 6,343,689 B1 * | 2/2002 | Garbagnati et al. ......... 198/853 |
| 7,597,188 B2 * | 10/2009 | Volpi ......................... 198/853 |
| 2006/0249358 A1 * | 11/2006 | Hartman et al. ............. 198/850 |

* cited by examiner

PLASTIC CHAIN CONVEYOR WITH MAGNET CONNECTING PINS

TECHNICAL FIELD

The invention relates to a plastic chain conveyor for carrying metal carriers on which, for instance, food product material for bread, candy, or the like are placed. More specifically, the invention relates to a plastic chain conveyor in a particularly steeply angled conveying line that can transport metal carriers or the like in a stable state without their slipping and falling or becoming misaligned.

BACKGROUND

Conventionally, in manufacturing processes for food products such as bread or candy, a carrier conveyor of predetermined length, such as a chain conveyor, belt conveyor, roller conveyor, or the like, is used to convey a metal carrier, such as a pan or plate, on which the food product materials are placed. The metal carrier is loaded onto and carried on the carrier conveyor.

In the bread manufacturing process in particular, for instance, in the carrier path linking the final fermentation process and baking process (for instance, tunnel ovens or the like) and other carrier paths, multiple chain conveyors that are loaded with and carry metal carriers on which food product materials are placed are connected to a predetermined length, put in a planar arrangement or in a steeply inclined arrangement, and carry the metal carriers to multiple manufacturing processes.

Moreover, metal chain conveyors and plastic chain conveyors (for example, see Japanese Patent Application Publication H7-309417) are known as conventional chain conveyors; but, in the majority of cases, in order to make it possible to set the shape, length, etc. at will, in order to make them lightweight, allowing for inexpensive use, and in order to allow for safe use, plastic chain conveyors made up of numerous plastic chain modules formed in predetermined widths and multiple bar-shaped plastic pins that link the front and back ends of these chain modules in a freely rotatable fashion are used.

In the plastic chain modules making up the plastic chain conveyor, for instance, the carrier surface (top surface) of the module body is smooth. The linking pieces at the front and back of the module body are provided with offset engaging parts that can be attached and detached interchangeably in the width direction of the conveyor. A through-hole is formed at the center of the side surface of the offset engaging part for inserting a plastic pin to link chain modules together so that they are engaged and freely rotatable.

An endless plastic chain conveyor of a predetermined length is constructed by linking the front and back ends of many plastic chain modules formed with a predetermined width using plastic connecting pins like those described. Multiple parallel strands (for instance, two strands spaced apart at a set distance) of these plastic chain conveyors are arranged at set intervals (matching the width of the carriers in order to load the carriers). And a metal carrier, on which food product material such as already described have been placed, is loaded onto and carried on the carrier surface (top surface) of the plastic chain conveyor.

If a carrier is carried by the plastic chain conveyor arranged in a horizontal state, the metal carrier is unlikely to fall from the plastic chain conveyor or become misaligned. But if the plastic chain conveyor is set up on a sharp incline (for instance, an angle of inclination of 30° to 60°, the metal carrier may slip from the smooth carrier surface (top surface) of the chain conveyor and fall from the plastic chain conveyor. Strong plate-shaped magnets having strong attractive force are placed at certain intervals within the plastic chain conveyors, which are arranged in multiple strands, in order to attract and hold the metal carrier.

But installing plate-shaped magnets within the plastic chain conveyors takes substantial time and effort because of the weight of the magnets and the high cost of the equipment and the plate-shaped magnets.

SUMMARY

With attention to these conventional problems, one purpose of this invention is to provide a plastic chain conveyor that is capable, even, for instance, when carrying metal carriers on which food product materials are placed in steeply inclined carrier lines, of carrying the carriers in a stable state without their slipping and falling from the smooth carrier surface of the chain conveyor and without the use of heavy and expensive plate-shaped magnets.

A plastic chain conveyor embodying features of the invention comprises a plurality of rows of one or more plastic chain modules having offset engaging parts along front and back ends of each of the rows. Each of the engaging parts has a through-hole that is aligned with the through-holes of an adjacent row. A plurality of connecting pins received in the aligned through-holes between the rows to rotatably link the rows together. At least some of the plurality of connecting pins are made of magnetic material that can attract a metal carrier material being carried on the chain conveyor.

The top carrier surface of the chain modules can even be smooth. Some of the connecting pins may be made of plastic. The connecting pins made of magnetic materials are placed at predetermined intervals in the length direction of the chain conveyor to link consecutive multiple plastic chain modules. The connecting pins made of magnetic materials use permanent magnets with two radially directed poles.

Moreover, stoppers for preventing the connecting pins from falling out may be embedded in one end of the through-holes formed in the center of the side of the offset engaging parts of the plastic module bodies. Protrusions for guiding the chain conveyor are formed on the side opposite the carrier surface of the chain modules.

As previously described, multiple hinges allowing for free rotation are formed at the front and back ends of the linked plastic chain modules by connecting pins. In the plastic chain conveyors made up of chain conveyor modules of predetermined length, the carrier surface of the main module bodies are smooth. Offset engaging parts that can be attached and separated from each other in the width direction of the chain conveyor are formed on the front and back linking end pieces of the modules. Through-holes for inserting bar-shaped connecting pins that link the chain modules such that they are engaged with each other in a freely rotatable fashion are formed. Some of the multiple connecting pins inserted into the through-holes in a freely insertable and removable fashion are made of magnetic material capable of attracting the metal carrier material that is carried on the chain conveyor. These plastic chain conveyors demonstrate the following outstanding effects:

(a) even if metal carriers on which food product materials are placed are carried on the carrier line, they can be held in a stable state without slipping and falling from the smooth carrier surface of the chain conveyor;

(b) the conveyor can be used to hold and carry food products inexpensively and safely without the use of heavy and expensive plate-shaped magnets; and (c) the length of the chain conveyor can be set at will without much time or effort being needed for installing or for carrying the chain conveyor.

DETAILED DESCRIPTION

One version of a plastic chain conveyor embodying features of the invention is shown in FIGS. 1-9. The plastic chain conveyor 1 is installed on a steep incline (for instance, with an angle of inclination of 30° to 60°, but the invention is not limited to steep inclines: it is also possible to install the conveyor in a horizontal state.

Figure 5:
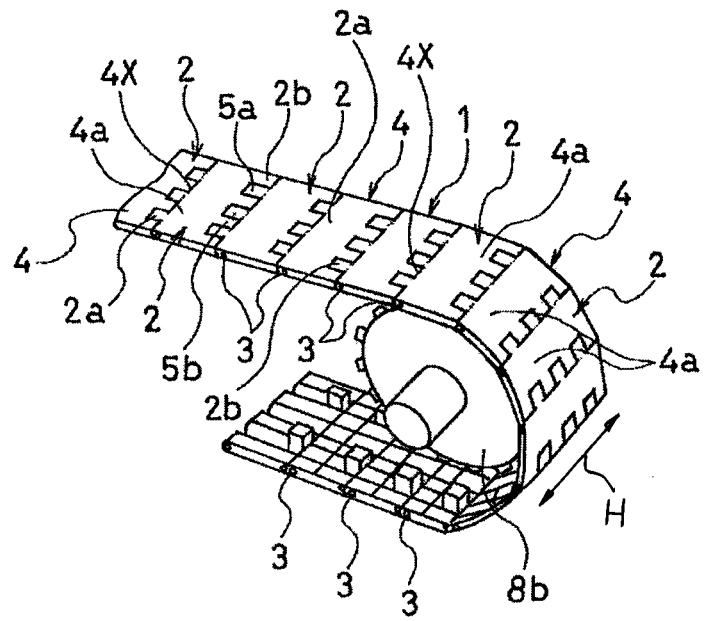
FIG. 5 is a partial expanded perspective view of a plastic chain conveyor in which this invention is implemented.
Figure 6:
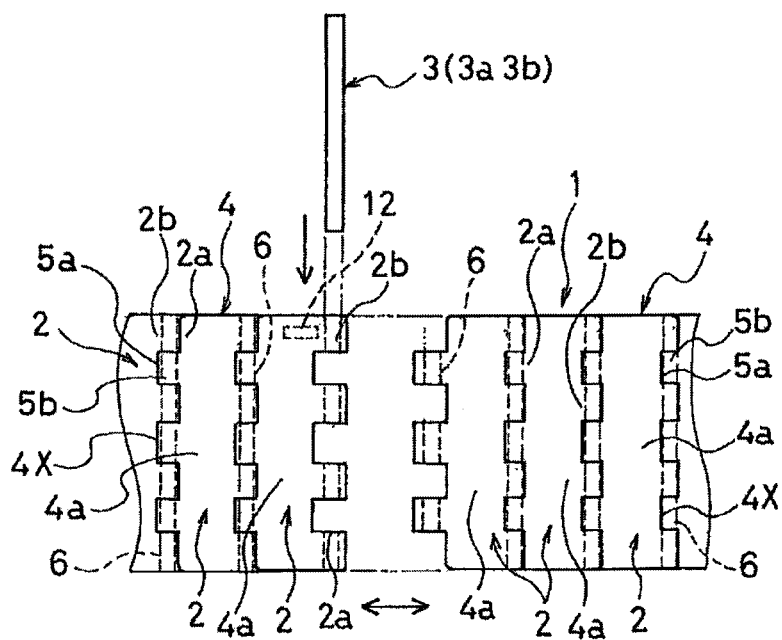
FIG. 6 is an explanatory plan view showing the plastic chain modules that make up the plastic chain conveyor in a linked state.
Figure 7:
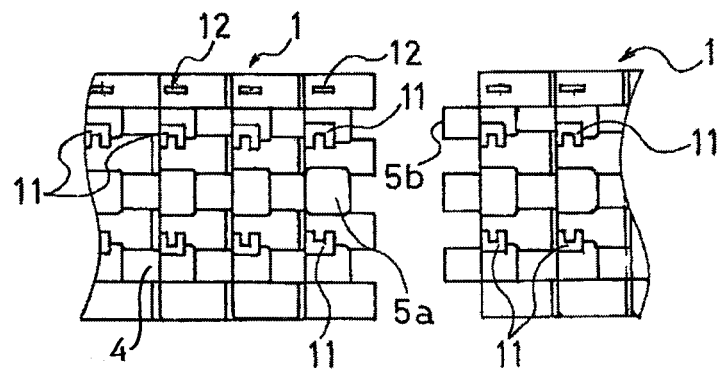
FIG. 7 is a bottom view of FIG. 6.

In the plastic chain conveyor 1, as shown in FIGS. 5-7, front and back ends 2a, 2b of plastic chain modules 2, which are made of a plastic material such as acetal, are rotatably linked by multiple plastic connecting pins 3a (for instance, bar-shaped connecting pins with circular cross-sections and made of nylon) and metal connecting pins 3b (in this example, bar-shaped connecting pins with circular cross-sections made of neodymium magnets that are radially bipolar) to form an endless plastic chain conveyor of predetermined length.

In the plastic chain modules 2 of the plastic chain conveyor 1, carrier surfaces 4a (top surfaces) of main module bodies 4 are smooth. Offset engaging parts 5a, 5b that can be attached to and detached from each other in the width direction H of the plastic chain conveyor 1 are formed on the linking end pieces 4X of the module bodies 4. Circular through-holes 6 for receiving the bar-shaped connecting pins 3a, 3b that link the concave and convex parts of the offset engaging parts 5a, 5b of the chain modules 2 in a rotatable fashion are formed at the centers of the sides of the offset engaging parts 5a, 5b.

For instance, as shown in FIG. 6, with the concave and convex parts of the offset engaging parts 5a, 5b of the chain modules 2 in an engaged state, the bar-shaped connecting pins 3a, 3b with a diameter of around 6 mm are inserted from one side of the plastic chain conveyor 1 into the through-holes 6, sequentially connecting and linking the chain modules 2. Although the chain conveyor shown in the drawings is constructed of a series of sequential single modules, the chain conveyor could also be constructed of a series of widthwise rows of adjacent side-by-side chain modules linked row to row by connecting pins 3a, 3b.

Figure 1:
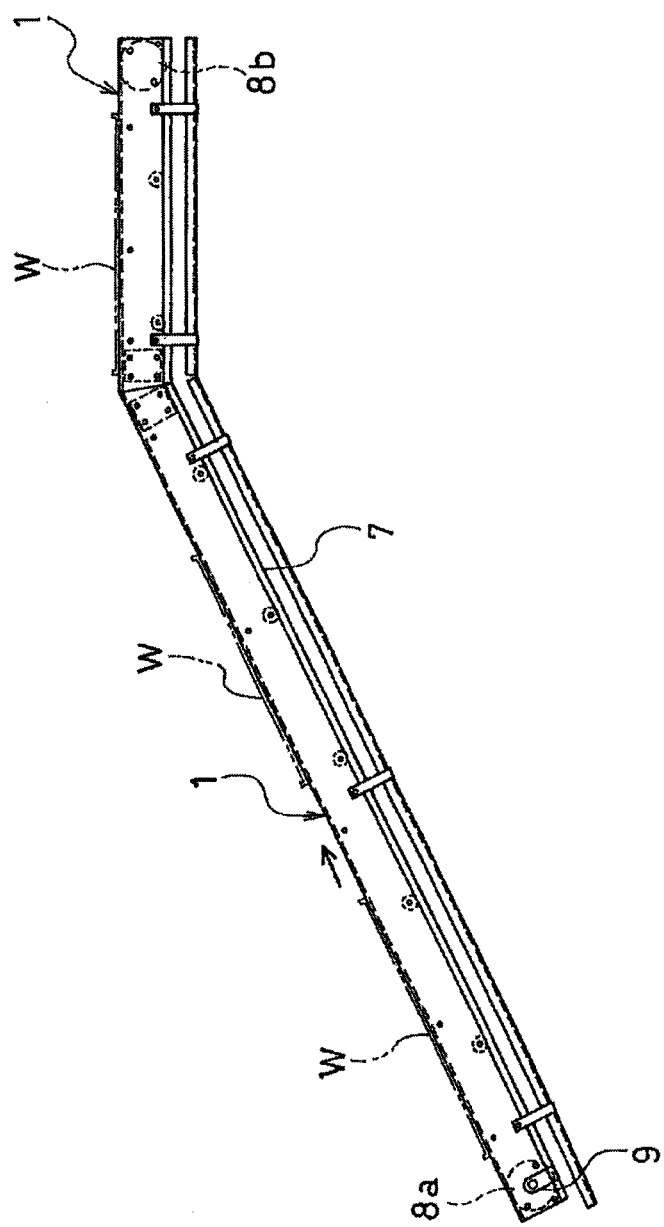
FIG. 1 is a partial front view of a plastic chain conveyor in which this invention is implemented.
Figure 2:
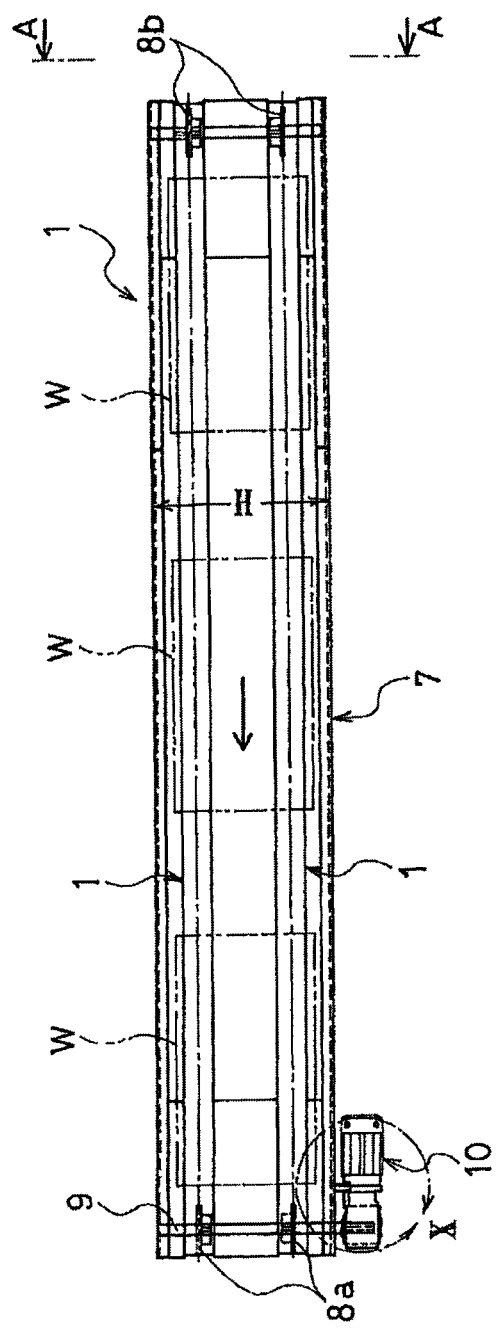
FIG. 2 is a plan view of FIG. 1.
Figure 3:
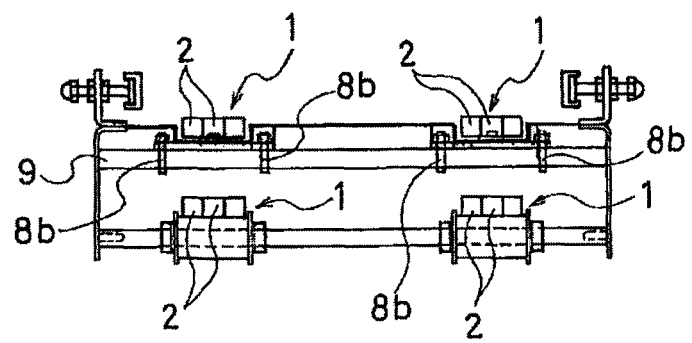
FIG. 3 is an expanded view along the A-A arrows in FIG. 2.
Figure 4:
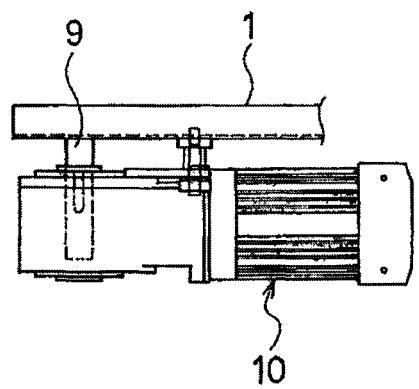
FIG. 4 is an expanded view of the X part of FIG. 2.

At the predetermined width thus constructed (in this embodiment, a width of 80 mm to 90 mm is used for the chain conveyor, but the chain width is not particularly limited, and any desired width can be used), two endless plastic chain conveyors 1 of predetermined length are arranged in two parallel strands at a predetermined separation (corresponding to metal carriers W, such as pans, plates, or the like, on which the food product materials or the like are placed). The strands are arranged on drive sprockets 8a and driven sprockets 8b that are installed at the entrance and exit ends of a conveyer frame 7. As shown in FIGS. 2 and 4, the metal carrier W loaded onto the endless plastic chain conveyors 1 is conveyed by applying a rotary drive by means of a drive motor 10 provided on a drive shaft 9 of the drive sprockets 8a.

Figure 8:
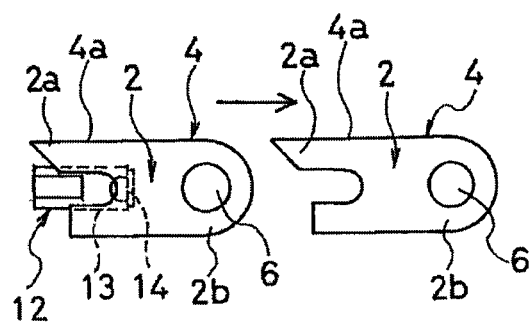
FIG. 8 is an explanatory view of the stopper for preventing the connecting pins from falling out embedded in the through-hole of a plastic chain module.
Figure 9:
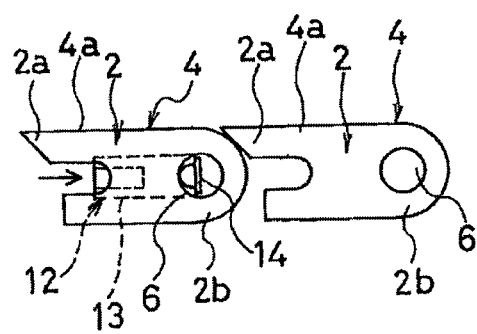
FIG. 9 is an explanatory view of the stopper for preventing the connecting pins from falling out embedded in the through-hole of a plastic chain module.

On the opposite side of the carrier surface 4a of the chain module body 4, as shown in FIG. 7, mutually opposing guide protrusions 11 with a U-shaped cross-section are formed in the length direction of the plastic chain conveyor 1. Moreover, as shown in FIGS. 8 and 9, stoppers 12 for preventing the connecting pins 3a, 3b from falling out are embedded at one end of the through-holes 6 formed at the centers of the sides of the offset engaging parts 5a, 5b of the plastic chain module bodies.

To accommodate these stoppers 12, slide holes 13 are formed perpendicular to the through-holes for inserting the connecting pins 3a, 3b into one end in the width direction H of the chain modules 2. Stopper pins 14 are inserted in a slidable fashion in the slide holes 13 by pushing the stopper pins 14 into the through-holes 6 as shown in FIGS. 8 and 9. The connecting pins 3a, 3b are held in the through-holes 6 and prevented from falling out. By removing the stopper pins, the plastic chain modules 2 can be separated and the length etc. of the plastic chain conveyor can be easily adjusted.

If the plastic chain conveyor 1 is used as an inclined chain conveyor by installing it on a steep incline (for instance, with an angle of inclination of 30° to 60°, connecting pins 3b made of magnetic material are used as some of the multiple connecting pins 3 for linking the plastic chain modules 2 in advance. And the connecting pins 3b made of this magnetic material are placed at predetermined intervals (corresponding to the length of the metal carriers W) in the length direction of the plastic chain conveyor 1.

Because the metal carrier W, loaded with the food product material, is attracted and held by the connecting pins 3b made of magnetic material through the module bodies 4, the carrier W can be carried safely and securely to a target manufacturing process position without slipping and falling from the plastic chain conveyor 1 and without its position, orientation, etc. changing.

Moreover, because no metal chain conveyors, plate-shaped magnets, etc. are used, even if food products are being carried, the conveyor can be used without concern for sanitation or quality maintenance.

As already explained, because some of the multiple connecting pins 3a, 3b inserted in an insertable and removable fashion into the through-holes 6 formed in the plastic chain modules 2 are made of a magnetic material that can attract the carrier material (metal carrier W) being carried on the plastic chain conveyor 1, even if metal carriers on which food product materials are placed are carried on a carrier line up a steep incline, the food product can be carried in a stable state without having the metal carriers W slip and fall from the plastic chain conveyor 1.

Moreover, the conveyor can be used inexpensively and safely for carrying food products without the use of conventional heavy and expensive plate-shaped magnets, and the length of the chain conveyor can be adjusted at will without requiring much time or effort.

In the examples, the plastic chain conveyor 1 was described as a chain conveyor for carrying food products, but it is not limited to a chain conveyor for carrying food products; it can also be applied to cases where other articles are to be carried.

PARTS LIST

1 Plastic chain conveyor
2 Plastic chain module
2a, 2b Front and back ends of plastic chain module
3a Metal connecting pin
4 Module body
4a Carrier surface
4X Linking end piece
5a, 5b Engaging part
6 Through-hole
7 Conveyor frame
8a Drive sprocket
8b Driven sprocket
9 Drive shaft
10 Drive motor
11 Guide protrusion
12 Stopper
13 Slide hole
14 Stopper pin

What is claimed is:

1. A plastic chain conveyor comprising:
   a plurality of rows of one or more plastic chain modules having offset engaging parts along front and back ends of each of the rows, wherein each of the engaging parts has a through-hole that is aligned with the through-holes of an adjacent row;
   a plurality of connecting pins received in the aligned through-holes between the rows to rotatably link the rows together;
   wherein at least some of the plurality of connecting pins are made of permanent-magnet magnetic material.

2. The plastic chain conveyor of claim 1 wherein the plastic chain modules have a smooth top carrier surface.

3. The plastic chain conveyor of claim 1 wherein the connecting pins made of permanent-magnet magnetic material are placed at predetermined intervals in the length direction of the chain conveyor.

4. The plastic chain conveyor of claim 1 wherein radially bipolar permanent magnets are used for the connecting pins made of permanent-magnet magnetic material.

5. The plastic chain conveyor of claim 1 wherein stoppers for preventing the plurality of connecting pins from migrating out of the through-holes are embedded in one end of the through-holes at a side of each row.

6. The plastic chain conveyor of claim 1 wherein the plastic chain modules have a smooth top carrier surface and an opposite surface on which guide protrusions are formed.

7. The plastic chain conveyor of claim 1 further comprising a frame supporting the plastic chain conveyor on an incline.

8. The plastic chain conveyor of claim 1 comprising two strands of plastic conveyor chain arranged in parallel.

9. A plastic chain conveyor comprising:
   a plurality of rows of one or more plastic chain modules having offset engaging parts along front and back ends of each of the rows, wherein each of the engaging parts has a through-hole that is aligned with the through-holes of an adjacent row;
   a plurality of connecting pins received in the aligned through-holes between the rows to rotatably link the rows together;
   wherein at least some of the plurality of connecting pins are made of magnetic material; and
   wherein some of the plurality of connecting pins are made of a plastic material.

10. The plastic chain conveyor of claim 9 wherein the connecting pins made of magnetic material are made of permanent-magnet magnetic material.

11. A plastic chain conveyor comprising:
    a plurality of rows of one or more plastic chain modules having offset engaging parts along front and back ends of each of the rows, wherein each of the engaging parts has a through-hole that is aligned with the through-holes of an adjacent row;
    a plurality of connecting pins received in the aligned through-holes between the rows to rotatably link the rows together;
    wherein at least some of the plurality of connecting pins are made of magnetic material; and
    metal carriers carried on the chain conveyor and attracted to the magnetic material of the connecting pins.

12. The plastic chain conveyor of claim 11 wherein the connecting pins made of magnetic material are made of permanent-magnet magnetic material.

* * * * *